United States Patent [19]

Suzuki et al.

[11] Patent Number: 5,044,811
[45] Date of Patent: Sep. 3, 1991

[54] BALL JOINT

[75] Inventors: Keiichiro Suzuki, Shizuoka; Kazumasa Suzuki, Iwata; Masahiro Yamada, Shizuoka, all of Japan

[73] Assignee: Ishikawa Tekko Kabushiki Kaisha, Tokyo, Japan

[21] Appl. No.: 534,487

[22] Filed: Jun. 6, 1990

[30] Foreign Application Priority Data

Jun. 15, 1989 [JP] Japan ................... 1-69885

[51] Int. Cl.⁵ ............................ F16C 11/06
[52] U.S. Cl. ........................ 403/134; 403/133
[58] Field of Search ............. 403/134, 133, 135, 140, 403/132

[56] References Cited

U.S. PATENT DOCUMENTS

| | | | |
|---|---|---|---|
| 3,007,728 | 11/1961 | Hoffman | 403/134 X |
| 3,262,706 | 7/1966 | Hassan | 403/134 X |
| 3,273,923 | 9/1966 | Ulderup | 403/134 |
| 3,362,735 | 1/1968 | Maxeiner | 403/132 |
| 3,389,927 | 6/1968 | Herbenar | 403/140 |
| 4,017,197 | 4/1977 | Farrant | 403/132 X |
| 4,154,546 | 5/1979 | Merrick et al. | 403/134 |
| 4,220,418 | 9/1980 | Kondo et al. | 403/134 X |
| 4,714,368 | 12/1987 | Sawada et al. | 403/133 X |

Primary Examiner—Peter M. Cuomo
Attorney, Agent, or Firm—Morrison Law Firm

[57] ABSTRACT

A ball joint has a ball seat fitted in a through hole of a socket. A recessed part of the socket has the same diameter as a receiving part of the ball seat. An attaching part of a dust cover is clamped into the recess formed by the recessed part and the receiving part to seal the interior of the ball joint from the entry of moisture and dirt, and to provide lateral support to the ball seat. A double-ended version is disclosed wherein attaching parts of two dust covers seal and provide lateral support to opposed ends of the ball seat.

5 Claims, 3 Drawing Sheets

BALL JOINT

BACKGROUND OF THE INVENTION

1. Field of the Invention

The present invention relates to a ball joint having a dust cover thereon.

2. Description of the Prior Art

A ball joint shown in FIG. 4 is a known example of conventional ball joints.

In FIG. 4, numeral 1 denotes a socket made of steel or other metal. Socket 1 has a cylindrical through hole 2 formed therein and open at both ends. A recessed groove 3 is formed about the outer surface at one end of socket 1. A shank pestle 4 is integrally affixed to the outer surface of socket 1.

Numeral 5 denotes a ball stud made of steel or other metal having a ball portion 6 integrally formed with a shank portion 7. A stopper 8 is disport at middle part of shank portion 7. The diameter of stopper 8 is larger than the diameter of shank portion 7.

Numeral 9 denotes a ball seat made of a hard thermoplastic resin with a cylindrical outer surface fitted into socket 1. Ball seat 9 is open at one end and has flanges 10 and 11 formed on the outer surfaces of its opposed ends.

Numeral 12 denotes a cylindrical dust cover made of synthetic rubber. An attaching part 13 is disposed at one end of dust cover 12 to lock into the recessed groove 3 of socket 1. A slip 14 is formed at the other end of the dust cover to slidably attach dust cover 12 around the outer surface of shank portion 7 of ball stud 5.

Ball portion 6 of ball stud 5 is inserted, together with ball seat 9 positioned therearound, into through hole 2 of socket 1 with or without pressure. Ball portion 6 of ball stud 5 is slidably supported in ball seat 9. Shank portion 7 of ball stud 5 protrudes from ball seat 9. Flanges 10 and 11 at the ends of ball seat 9 lock over their respective ends of socket 1. Dust cover 12 is positioned to face the opening at one end of socket 1. An attaching part 13 of dust cover 12 is clamped into recessed groove 3 of socket 1 by a ring-shaped metal clip 15. Slip 14 is attached around shank 7 of ball stud 5 below stopper 8. When thus installed, dust cover 12 covers the opening of ball seat 9.

A ball joint of this type, with dust cover 12 excludeds dirt and muddy water in order to improve the life of the ball joint. However, this conventional ball joint presents a problem in that when load is applied at right angles to ball stud 5, there is a chance that a slight space may be formed between socket 1 and flange 11, thus permitting dirt and/or muddy water to enter the space between socket 1 and flange 11 and migrate along the surface of through hole 2 and into ball seat 9, where it can couse wear.

A ball joint shown in FIG. 5 is also a widely known example of conventional ball joints.

Unlike the above example shown in FIG. 4, instead of providing socket 1 with recessed groove 3 a thick catching receiver 16 is disposed at one end of ball seat 9. A flange 16 abuts one end of socket 1. A locking attaching part 13 of dust cover 12 is clamped into flange 16 by a metal clip. A recess 17 around the outer surface of the lower part of ball seat 9 provides relief to permit the ball seat 9 to easily inserted into through hole 2.

With this ball joint, part "a", where the diameter of the opening of ball seat 9 is smallest, is located beyond the end of socket 1, thus causing the drawing strength of ball stud 5 from socket 1 to be reduced. In order to improve the drawing strength of ball stud 5, it is necessary to position the smallest diameter part "a" of the opening of ball seat 9 as close as possible to the end of socket 1. However, doing this requires making socket 1 and ball stud 5 longer in the direction of the shank 7 and thereby increasing the fitting length H of ball stud 5. This is disadvantageous because the strength of ball stud 5 may suffer and the size of the entire ball joint is increased.

As described above, the conventional technique for fitting a dust cover on a ball joint has problems ability in its to seal the ball joint and in the drawing strength of the ball stud.

A major object of the present invention is to provide a ball joint with improved drawing strength of its ball stud from the socket, while maintaining satisfactory sealing with the dust cover.

SUMMARY OF THE INVENTION

Briefly stated, the present invention provides a ball joint having a ball seat fitted in a through hole in a socket. A recessed part of the socket has the same diamenter as a receiving part of the ball seat. An attaching part of a dust cover is clamped into the recess formed by the recessed part and the receiving past to seal the interior of the ball joint from the entry of moisture and dirt, and to provide lateral support to the ball seat. A double-ended version is disclosed wherein attaching parts of two dust covers seal and provide lateral support to opposed ends of the ball seat.

According to an embodiment of the invention, there is provided a ball joint comprising; a socket, a cylindrical through hole in the socket, a ball seat in the through hole, a ball stud with a ball portion slidably supported in the socket, at least one shank portion of the ball stud protruding from the through hole in at least one direction, at least one dust cover; a locking part for attaching the dust cover to the socket; a recessed part around an outer surface at an end of the socket; a receiving part on an outer surface near an end of the ball seat, an outer surface of the receiving part being disposed at a common level with that of the recessed part, an attaching part of the dust cover being clamped around surfaces of the recessed part and the receiving portion.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
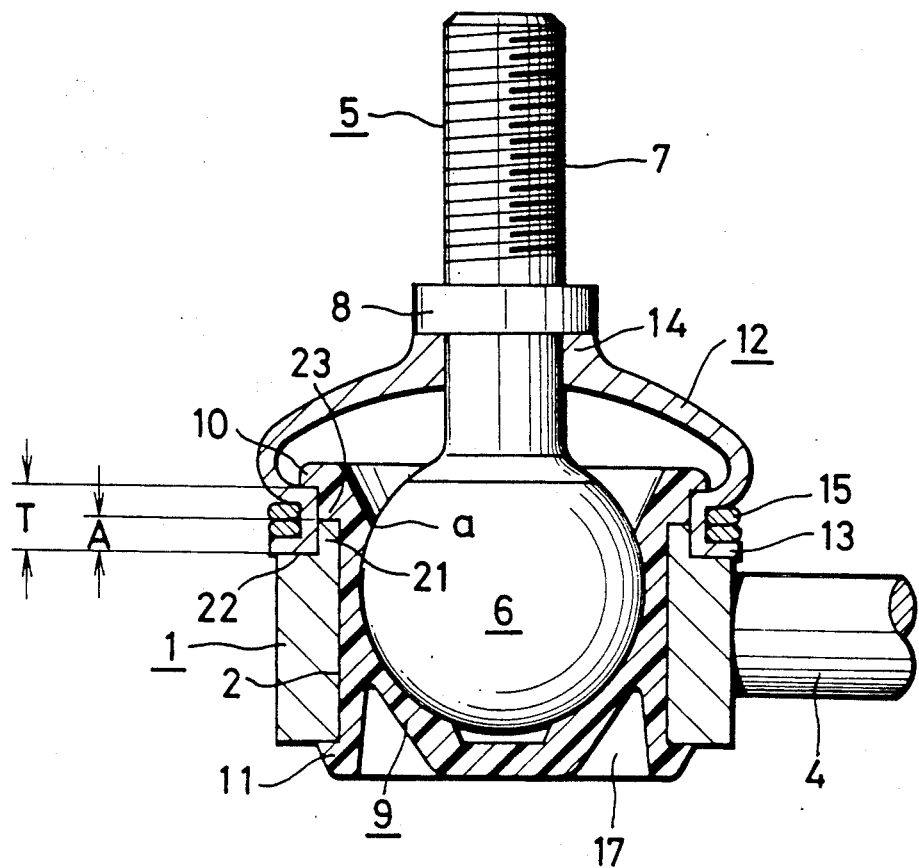
FIG. 1 is a longitudinal cross section of an embodiment of a ball joint according to the present invention.
Figure 4:
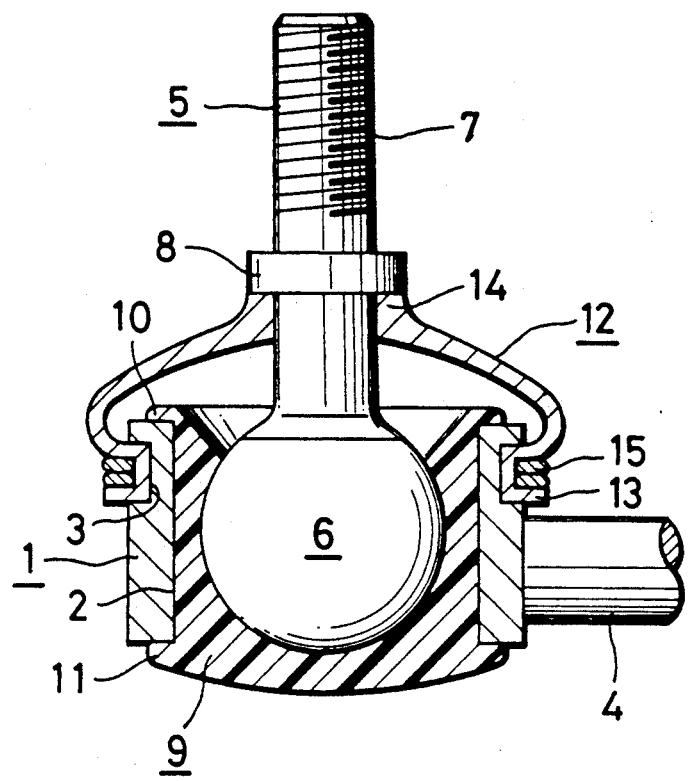
FIGS. 4 and 5 are cross sections showing examples of conventional ball joints according to the prior are.
Figure 5:
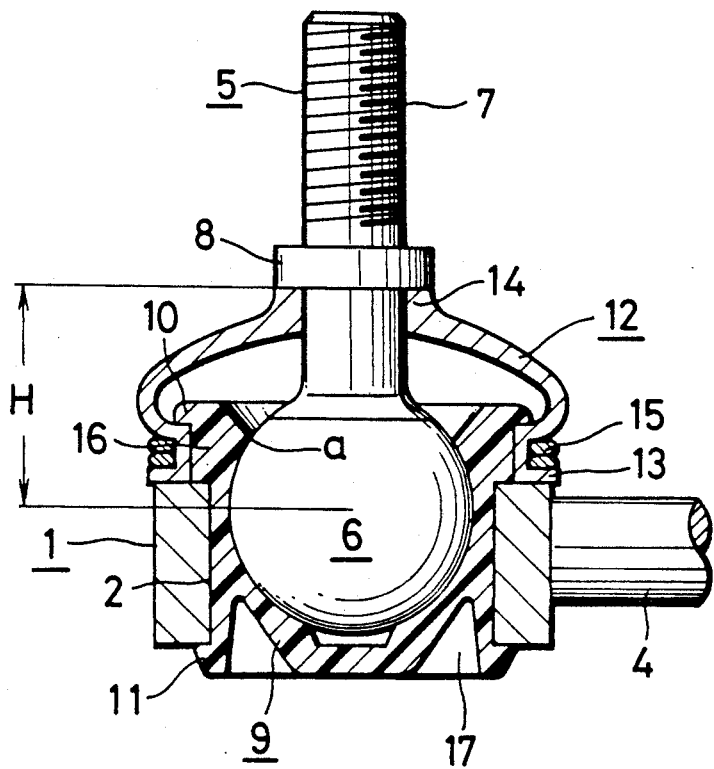

A detailed description of an embodiment of the present invention is given hereunder referring to FIG. 1:

A ball joint in FIG. 1 is similar to those explained above with reference to FIGS. 4 and 5, except for the manner of attaching the dust cover. Thus, parts corresponding to those of FIGS. 4 and 5 are given the same reference numerals in the following description.

A ball joint of the present embodiment of the invention includes a socket 1 made of steel or other metal having cylindrical through hole 2 that opens at both ends of the socket 1. A shank pestle 4 is integrally affixed to the exterior of socket 1. A ball stud 5, made of steel or other metal, includes a ball portion 6, a shank portion 7 and a stopper 8. The diameter of stopper 8 is larger than the diameter of shank portion 7. A ball seat 9, made of hard thermoplastic resin, includes a cylindrical outer surface and an opening at one end. Flanges 10 and 11 are disposed at opposed ends of an outer surface of ball seat 9. A recess 17 is formed in the outer surface of the bottom of ball seat 9. A cylindrical dust cover 12, made of synthetic rubber includes an attaching part 13 forming one end of said dust cover 12. A slip 14 forms the other end of the dust cover. A clip 15 engages attaching part 13, as will be explained.

To assembly the ball joint of FIG. 1, ball portion 6 of ball stud 5 is inserted into ball seat 9. Ball seat 9 is fitted into through hole 2 of socket 1 with or without pressure. Ball portion 6 of ball stud 5 is thus slidably supported with shank portion 7 protruding from ball seat 9. Flanges 10 and 11 at opposed ends of ball seat 9 face their respective ends of socket 1. Dust cover 12 is positioned to face the open end of socket 1, with its attaching part 13 lockingly fitted to the side of socket 1 and clamped by clip 15 and with its slip 14 fitted on shank 7 below stopper so that the opening of ball seat 9 is covered by dust cover 12.

Where dust cover 12 is attached to socket 1, a cylindrical wall 21 extends upon from socket 1. The inner diameter of cylindrical wall 21 is identical to that of through hole 2. An outer diameter of wall 21 is smaller than the diameter of socket 1, thus forming a recessed part 22 around one end of outer surface of socket 1. A receiving part 23 of ball seat 9 below flange 10 has an inner surface having the same diameter as an inner surface of the recessed part 22 of one end of the socket 1. Thus, a recess to receive attaching part 13 of dust cover 12 is formed by recessed part 22 of socket 1 and receiving part 23 of ball seat 9. The outer diameter of the formed recess being smaller than the outer diameter of socket 1 so that attaching part 13 of dust cover 12 is lockingly fitted and fixed by clamping around the outer surfaces of recessed part 22 and receiving part 23.

A height A of wall 21 (also recessed part 22 of socket 1) is set in the range of ¼ to ¾ of a height T of attaching part 13 of dust cover 12. For example, height A may be ½ of height T. Accordingly, the height of receiving part 23 of ball seat 9 is T minus A.

As described as above, recessed part 22 is formed by wall 21 extending from an end of socket 1. Attaching part 13 of dust cover 12 fits the vertical distance from recessed part 22 to receiving part 23. Therefore, can be positioned closed the smallest diameter part a of the opening of ball seat 9 to the end of socket 1, even within wall part 21, thereby limiting the required aperture of smallest diameter part a of the opening of ball seat 9 and increasing the drawing load. In addition, by setting the height A of recessed part 22 of socket A within the range from ¼ to ¾ of height T of attaching part 13 of dust cover 12, it is possible to select the best position of smallest diameter part a of the opening of ball seat 9 and its sealing ability.

Furthermore, as attaching part 13 of dust cover 12 abuts the outer surface of ball seat 9, the clamping effectiveness of clip 15 is improved, and improved sealing is therefore obtained.

With a conventional ball joint having a ball portion 6 of ball stud 5 with a diameter of 20 mm and a ball seat 9 made of polyacetyl resin, the resulting drawing strength is normally approx. 130 kg. A ball joint according to the present invention, however, provides a maximum drawing strength of 280 kg.

Figure 2:
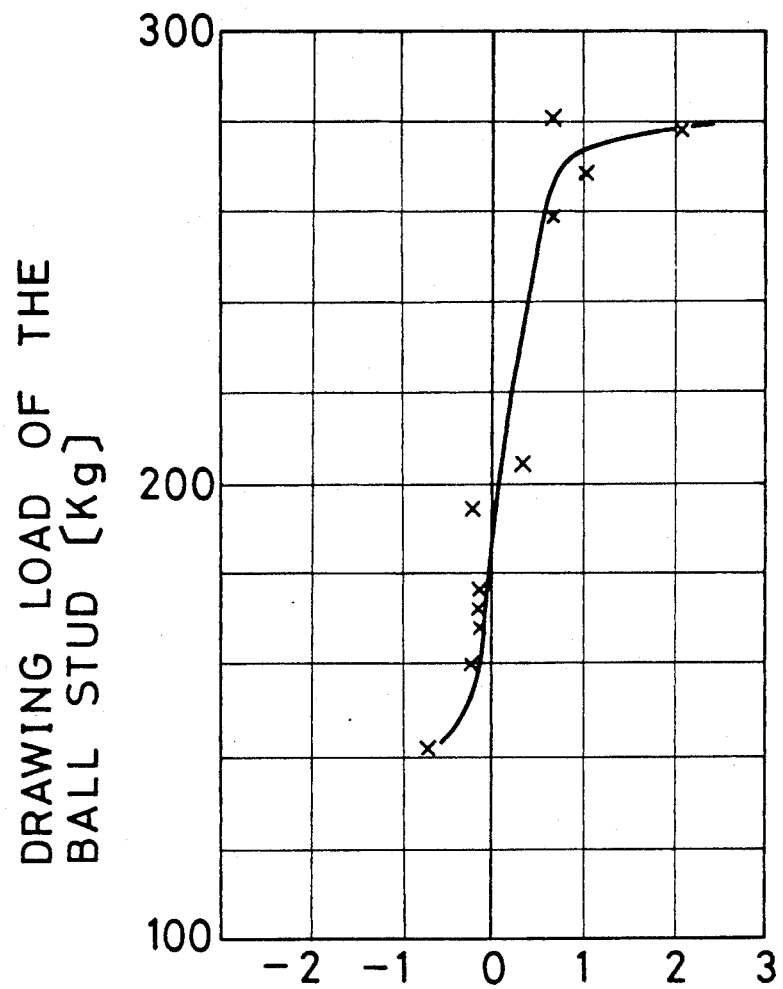
FIG. 2 is a curve of the drawing load of the ball joint of FIG. 1.

Referring now to FIG. 2, data is presented showing actual measurements of the relationship between the distance between the smallest diameter part and socket 1, and the drawing strength of ball stud 5. It will be noted that the drawing strength changes by a factor of about two over a distance of about 1 mm.

Figure 3:
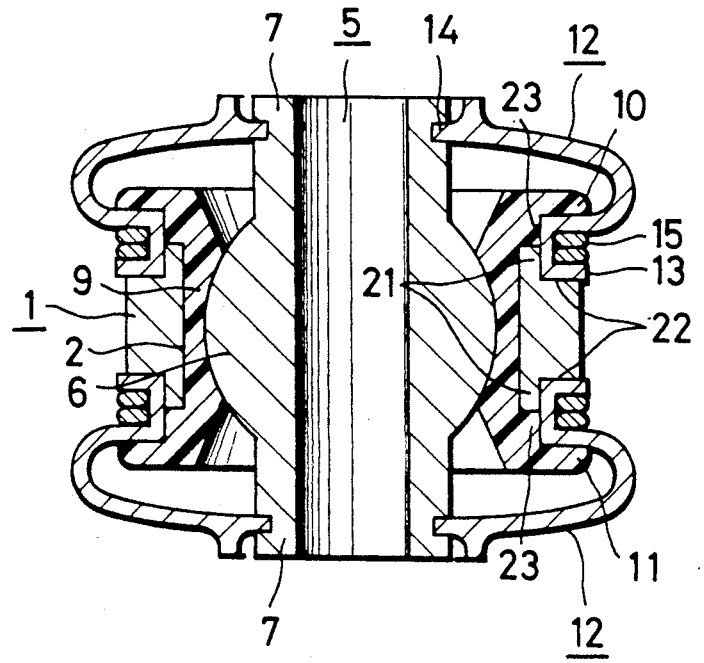
FIG. 3 is a longitudinal cross section of another embodiment of a ball joint according to the present invention.

Referring now to FIG. 3, another embodiment of the present invention employs a ball stud 5 having a ball portion 6 with cylindrical shank portions 7 protruding from both ends of ball portion 6. A ball seat 9 is open at both ends. A dust cover 12 is attached between each shank portion 7 and its respective end of socket 1, thereby covering both openings of ball seat 9 with dust covers 12. In the same manner, the present invention is applicable to a ball joint wherein the shank is inserted through the center of ball stud 5.

According to the present invention, it is possible to position the smallest diameter part of the opening of the ball seat 9 close to or within the end of the socket 1, by forming a recessed part 22 around the outer surface of the end of the socket 1 and fitting the attaching part 13 of the dust cover 12 in the area from the recessed part 22 to the receiving part 23 of the ball seat 9. Therefore, the present invention makes it possible to limit the required aperture of the smallest diameter part of the opening of the ball seat 9 and thereby to maintain a large drawing load.

In addition, as the attaching part of the dust cover abuts the outer surface of the ball seat 9, clamping and sealing are both improved.

By setting the height of the recessed part 22 of the socket 1 within the range of from ¼ to ¾ of the height of the attaching part 13 of the dust cover 12, it is possible to select the best position of the smallest diameter part a of the opening of the ball seat as well as to improve the sealing.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A ball joint comprising:
  a socket;
  a cylindrical through hole in said socket;
  a ball seat in said through hole;
  a ball stud with a ball portion slidably supported in said socket;
  at least one shank portion of said ball stud protruding from said through hole in at least one direction;
  at least one dust cover;
  a locking part for attaching said dust cover to said socket;

a recessed part around an outer surface at an end of said socket;

a receiving part on an outer surface near an end of said ball seat;

said receiving part having an inner surface being disposed at a common diameter with that of an inner surface of said recessed part;

an attaching part of said dust cover; and said attaching part being clamped around and abutting said inner surfaces of said recessed part and said receiving part.

2. A ball joint according to claim 1, wherein a height of said recessed part is in the range of from $\frac{1}{4}$ to $\frac{3}{4}$ of a height of said attaching part.

3. A ball joint according to claim 1 wherein said ball seat is a hard synthetic resin.

4. A ball joint according to claim 3 wherein said hard synthetic resin is pobyacetyl resin.

5. A ball joint according to claim 1, wherein said at least one shank portion includes first and second shank portions;

said first shank portion protruding in a first direction from said through hole;

said second shank portion protruding from said through hole in a second direction opposite to said first direction;

said at least one dust cover including first and second dust covers;

said first dust cover including a first attaching part clamped at a first end of said socket, and a second attaching part clamped at a second end of said socket, whereby said ball seat is clamped at both ends thereof to resist transverse displacement.

* * * * *